3,282,189
EXPOSURE CONTROL SYSTEM FOR CAMERAS
John W. McFarlane, Rochester, N.Y., assignor to Eastman Kodak Company, Rochester, N.Y., a corporation of New Jersey
Filed Jan. 6, 1964, Ser. No. 335,942
6 Claims. (Cl. 95—64)

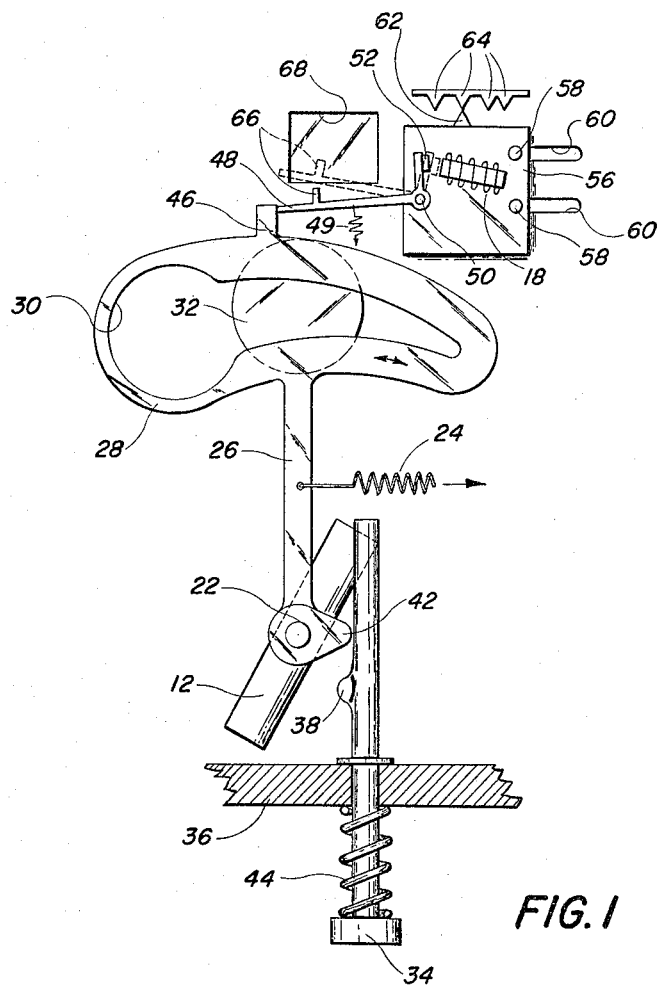
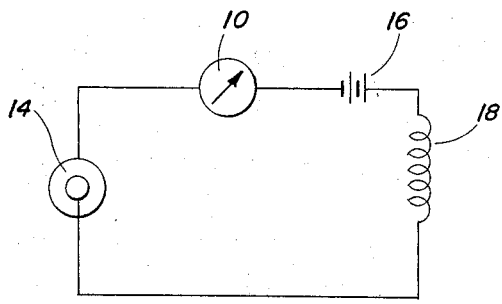

The present invention relates to a camera in which an exposure regulating device such as a diaphragm or shutter is normally controlled by a photoelectric system. More particularly the invention concerns means for automatically adjusting such regulating device to an intermediate setting, corresponding to average scene brightness, in the event the photoelectric exposure control system fails.

In a typical camera of this type failure of the electrical system, such as from a dead battery, permits the exposure regulating device to be set by a spring to one of its extreme positions. Such electrical failure thus causes an average scene to be overexposed or underexposed quite badly. Often there is no means provided in the camera to apprise the camera operator of such failure and much film can be wasted before he becomes aware of it.

It is therefore an important object of the invention to adjust an exposure regulating member of a camera to an intermediate setting upon failure of a photoelectric system that normally adjusts that member automatically in accordance with scene brightness.

Another object of the invention is to apprise a camera operator of such a failure in the photoelectric system.

Other objects of the invention will appear from the following description, reference being made to the accompanying drawing, wherein:

FIG. 1 is a front view of one form of the invention in the environment of a typical exposure control system; and FIG. 2 is an electrical wiring diagram adapted for use with, and incorporating elements of, the mechanism shown in FIG. 1.

Referring to the drawings, an electric measuring instrument 10 having a coil 12 pivoted at 22 is in circuit with and controlled by a photocell 14, which is illustrated as a photoconductive cell and which is illuminatable by scene light. These elements are in circuit with a battery 16 and a relay winding 18. The energization of instrument 10 and relay 18 is controlled by the resistance of cell 14, which depends upon the brightness of light to which the cell is exposed. In a well known manner, coil 12 of the instrument is pivoted counterclockwise against the tension of a spring 24 as an inverse function of the illumination of cell 14.

An arm 26 on coil 12 pivots with the coil and carries an exposure regulating device, illustrated as a diaphragm vane 28 having a tapered aperture 30. The vane aperture cooperates with a taking lens 32 of the camera to form an exposure aperture whose area therefore is a function of the illumination of cell 14.

A camera actuating member 34 is guided for vertical sliding motion by frame members such as 36 and has an ear 38 cooperating with a cam 42, which is integral with coil 12 and vane 28. Initial depression of member 34, against the tension of a spring 44, causes ear 38 to engage cam 42 and rock vane 28 counterclockwise about the instrument axis 22. This moves an ear 46 on vane 28 to the left of the tip of a lever 48, which is pivoted at 50 and urged counterclockwise by a spring 49.

Lever 48 carries an armature 52 cooperating with relay winding 18 and normally is maintained by the relay in its clockwise position, as shown in broken lines, even when cell 14 is illuminated at a level somewhat below that corresponding to maximum diaphragm aperture.

When lever 48 is in its clockwise position it lies outside the path of ear 46 on vane 28 and permits the vane to be moved fully clockwise by spring 24. However, if relay 18 is de-energized at the time vane 28 is rocked clockwise by depression of member 34, then the subsequent clockwise return movement of the vane under spring tension is interrupted by lever 48 at the position shown in FIG. 1. It will be seen, therefore, that any failure in the electrical components of the system, resulting in de-energization of relay 18, results in setting vane 28 to an intermediate position. This position preferably is chosen to correspond to average scene brightness for a selected film sensitivity.

Relay 18 and lever 48 can be mounted on a movable base 56, such as by pins 58 cooperating with slots 60 in a frame member (not shown). By moving base 56 to the right or left the position of lever 48, and therefore the position assumed by vane 28 upon failure of the electrical system, can be varied as a function of film sensitivity, as indicated by an index mark 62 on base 56, cooperating with fixed scale indicia 64.

An ear 66 on lever 46 normally appears within the frame of the camera viewfinder 68, indicating that relay 18 is energized. When an electrical system failure occurs, usually because of a dead battery, lever 48 carries ear 66 out of the viewfinder frame, apprising the camera operator of that failure.

The invention has been described in detail with particular reference to a preferred embodiment thereof, but it will be understood that variations and modifications can be effected within the spirit and scope of the invention as described hereinabove and as defined in the appended claims.

I claim:

1. For use in a camera having an exposure regulating device adjustable throughout a range of settings corresponding to a range of scene brightness values with the end points of said range of settings corresponding to a low scene light condition and a bright scene light condition, respectively, and having an electrical system for adjusting said device under normal conditions, a fail-safe system comprising in combination: means for sensing a failure in said electrical system; and means controlled by said sensing means, in response to said failure, for automatically adjusting said regulating device to a predetermined setting intermediate said end points corresponding to a predicted value of average scene brightness.

2. For use in a camera having a manually operable camera actuating member, an exposure regulating device movable throughout a range of positions corresponding to a range of scene brightness values, resilient means for moving said device in a first direction, and a photoelectric exposure control system for moving said device in the opposite direction under normal conditions, the combination comprising: means controlled by said camera actuating member, upon operation of the latter, for moving said exposure regulating device in said opposite direction to a predetermined position and then releasing said regulating device for return movement by said resilient means in said first direction; normally disabled stop means effective, upon being enabled, for stopping said return movement of said regulating device at a predetermined position intermediate in its range of positions; and means responsive to a failure in said photoelectric exposure control system for enabling said stop means.

3. The combination defined in claim 2, wherein said exposure regulating device comprises a lens diaphragm.

4. The combination defined in claim 2, with means for selectively adjusting the position of said stop means.

5. For use in a camera having a manually operable camera actuating member, an exposure regulating device movable throughout a range of positions corresponding to a range of scene brightness values, resilient means for moving said device in a first direction, and a photoelectric exposure control system for moving said device in the opposite direction under normal conditions, the combination comprising: means controlled by said camera actuating member, upon operation of the latter, for moving said exposure regulating device in said opposite direction to a predetermined position and releasing said regulating device for return movement by said resilient means in said first direction; a latch having first and second positions and effective only when in its second position for stopping said return movement of said regulating device at a predetermined position intermediate in its range; a relay in electrical circuit with said exposure control system and normally energized thereby for maintaining said latch in its first position; and means for moving said latch to its second position upon de-enerization of said relay.

6. For use in a camera having an exposure regulating device adjustable throughout a range of settings corresponding to a range of scene brightness values, and having an electrical system for adjusting said device under normal conditions, a fail-safe system comprising in combination: means for sensing a failure in said electrical system; means controlled by said sensing means, in response to said failure, for automatically adjusting said regulating device to a predetermined intermediate setting corresponding to a predicted value of average scene brightness, and means for adjusting said intermediate setting.

References Cited by the Examiner

UNITED STATES PATENTS 2,973,699   3/1961   Nerwin _____ 95—10

JOHN M. HORAN, *Primary Examiner.*